June 14, 1960 J. A. LAWLER ET AL 2,940,518
MEANS AND METHOD FOR MINIMIZING PRESSURE DROP IN AN EXPULSIVE
GAS DURING EXPULSION OF A LIQUID PROPELLANT
Filed July 26, 1955
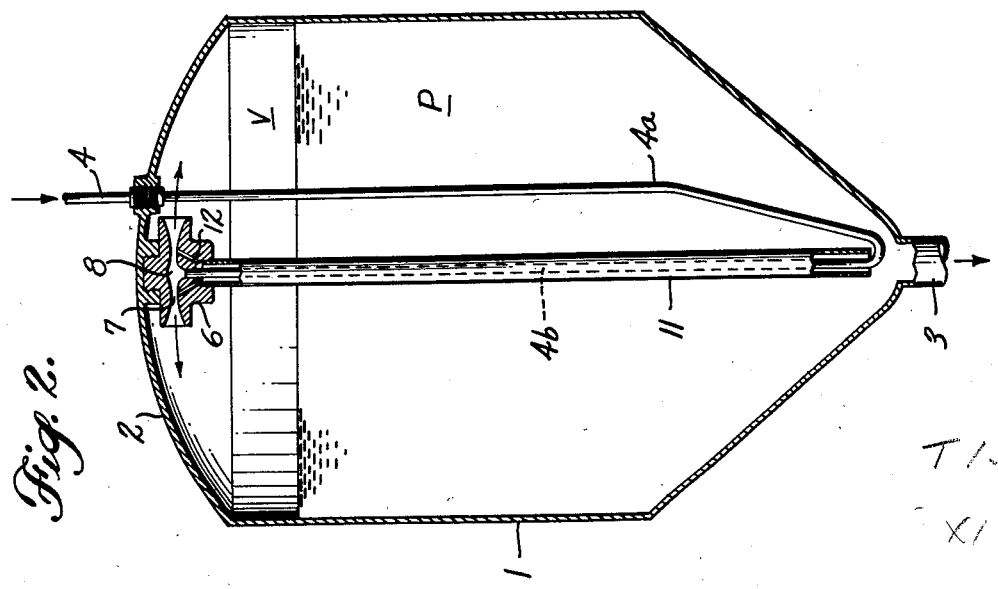
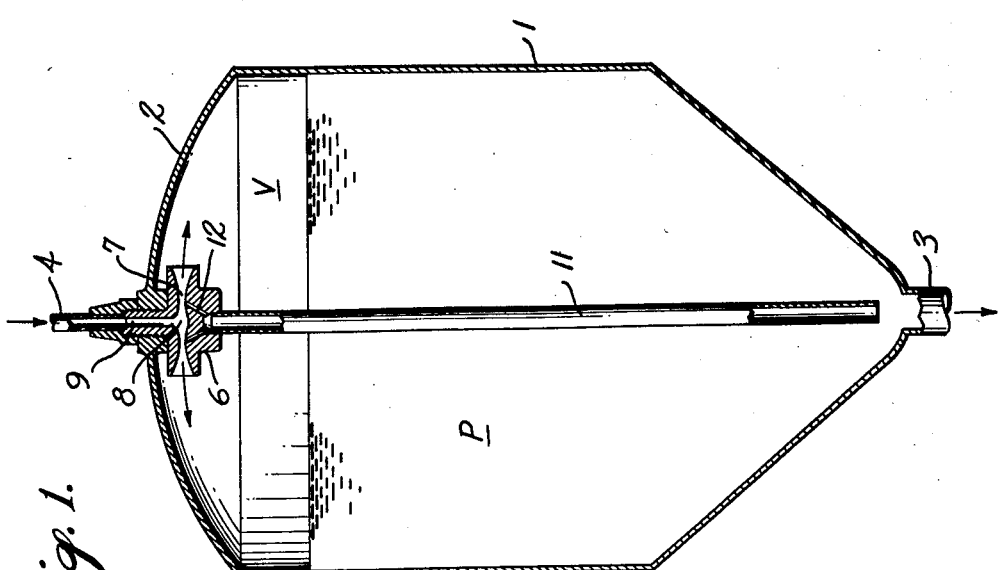
INVENTORS
JOHN A. LAWLER
CLINTON A. WILKINSON
BY
Reynolds, Beach & Christensen
ATTORNEYS

United States Patent Office 2,940,518
Patented June 14, 1960

2,940,518

MEANS AND METHOD FOR MINIMIZING PRESSURE DROP IN AN EXPULSIVE GAS DURING EXPULSION OF A LIQUID PROPELLANT

John A. Lawler and Clinton A. Wilkinson, Seattle, Wash., assignors to Boeing Airplane Company, Seattle, Wash., a corporation of Delaware Filed July 26, 1955, Ser. No. 524,403

9 Claims. (Cl. 158—50.1)

The present invention relates to the expulsion or discharge of a liquid propellant or fuel for rocket motors, from a tank wherein the same is contained to the rocket motor, and deals with the specific problem of maintaining the temperature or at least minimizing the drop in the temperature of the expulsive gas as a result of its expansion in the course of expelling the liquid propellant.

It is common practice in the rocket art to expel liquid fuel from a closed tank by means of gas under high pressure contained in a second tank connected to the liquid tank, with suitable conduits and valves to initiate and control the flow. To expel the liquid from the liquid tank it is only necessary to open the gas valve, admitting the high-pressure gas to the vapor space above the liquid in the liquid tank, thereby forcing the liquid from the tank through an outlet leading from its liquid space to the rocket burner. At the beginning of the operation, both the liquid and the compressed gas are at the ambient temperature. However, as the gas expands into the liquid tank, it does work in forcing the liquid from the tank, and so expands substantially adiabatically. The temperature of the gas, in consequence, is greatly reduced. It is obvious that a given weight of cold gas will occupy a smaller volume at a given pressure than it would if its temperature were higher. Stated differently and applied to the particular installation with which this invention is concerned, in order to expel a given volume of propellant liquid under a specified pressure, a larger weight of expulsive gas is required, since its temperature has dropped, than if the gas were at a higher temperature. In a ground-borne installation this would be of minor consequence, but in a rocket installation, where weight-saving is of utmost consequence, such added weight produced serious penalties, as is explained in more detail below.

The present invention provides a simple means and method whereby the drop in temperature of the gas in the liquid tank can be greatly minimized by effecting efficient and direct heat exchange between the body of liquid in the tank and the gas which has been discharged into the tank, thereby warming the gas in the tank from the liquid itself, and producing a marked weight-saving in the installation as a whole.

Typical figures in connection with the use of the present invention will assist in visualizing its importance. In a conventional arrangement, it is estimated that the expulsive gas in the fuel tank at the end of the expulsion of liquid would be at a temperature approximately —110° F., or 350° R. The temperature, of course, varies during the course of the operation, and the last gas which enters the tank would be as low as —160° F., or 300° R. Under these conditions, the given installation might require fifty pounds of helium (expulsive) gas at a pressure of about 4000 pounds per square inch. The tank necessary to retain this much gas under such a pressure becomes the major weight, so that in the typical installation the total weight of the tank and the helium would be approximately 1000 pounds. Helium is an extremely light gas. If, on the other hand, some other and heavier gas is used, the weight of the compressed gas is correspondingly increased. For example, nitrogen, which sometimes has been proposed or used, is about seven times as heavy as helium, and so it can be seen that using nitrogen, the weight of the same volume of gas would be some three hundred fifty pounds, instead of only fifty pounds, so that the total weight of the gas and tank would be very appreciably heavier than the one thousand pounds already mentioned.

Using the present invention, however, with a corresponding typical installation, it is expected that the final temperatures of the gas in the liquid tank would be not —110° F., but +40° F., or 500° R. This increase in temperature enables a saving of approximately twenty to twenty-five percent in the weight of the gas and of the containing tank. Such being the case, the actual weight savings in a rocket-propelled missile are cumulative, that is, if the weight of the tank and gas necessary to handle a given weight of fuel can be reduced, then the total weight of the missile is reduced, so that less fuel is required, which in turn reduces the amount of gas required for the same effect, or gives a greater boost for the same amount of gas and fuel. Furthermore, the reduction of weight of fuel and gas correspondingly reduces the amount of oxidizer, structure, wings, etc., which go to make up the complete missile, so that it is estimated that each pound of weight saved by the use of this invention will actually reduce the overall weight of the missile, or increase its pay load, by approximately three to four pounds. In other words, the saving of three hundred pounds in weight of expulsive gas required might well reduce the overall weight of the missile by one thousand or more pounds. It is, therefore, apparent that by the present invention very substantial savings are capable of being produced, and these are of the utmost importance in such missiles.

In the present invention the invention is shown somewhat diagrammatically, and in two typical forms involving, in either form, the placing of the gas in active and intimate heat-exchange relationship with the liquid to be expelled, and to a degree maintaining the temperature of the tank also elevated, through heat-exchange relationships that will be explained more fully hereinafter.

Figure 1 is an axial vertical sectional view through such a tank and the heat-exchange provisions therein in a very simple form, and Figure 2 is a similar view, showing a somewhat modified form.

The tank 1 contains a liquid propellant P and above this propellant is a vapor space V. Preferably, the top 2 of the tank is domed, and its bottom may converge to a bottom outlet 3, which leads to the rocket motor, or burner. A duct 4 leads from a high-pressure gas tank (not shown) and may, itself, be considered as a source of gas under pressure. This duct 4 discharges in one way or another, by way of a connecting conduit later described, into the vapor space V.

Within the vapor space is a fitting 6 which is formed with at least one venturi throat 7, leading from a central chamber 8. A conduit 9, which may be no more than a port in the fitting 6, connects the duct 4 to this central chamber 8, so that gas entering the central chamber will discharge through the venturi throat or throats 7. Preferably, the venturi throat is substantially circular and directed radially outwardly in all directions from the central chamber 8.

A standpipe 11 leads from the liquid space P, and from a point therein near the bottom of the tank, to the fitting 6. It is connected by way of an orifice or orifices 12 in the fitting 6 to the throat of the venturi passage, in the low pressure region thereof, and preferably there are a number of such ports or orifices 12 angularly distributed about the circular throat 7. It follows that the venturi fitting represents one form of an aspirator device by which the high-pressure gas discharging into the vapor space will entrain liquid drawn up through the standpipe 11, and discharge this liquid as a mist of droplets intimately intermingled with the gas, into this vapor space and onto the dome's surface. In the vapor space these droplets will fall upon and condense with the liquid surface, and so will ultimately be discharged, but in the process of intimate admixture of the gas and the liquid mist the temperature of the liquid tends to maintain elevated the temperature of the gas, and so minimizes the drop in pressure of the gas. Furthermore, the venturi fitting 6 is preferably located within the domed top 2, in such a position that the gas and liquid droplets discharging from it will strike and run down over the interior surface of the dome 2, and so by contact with the relatively warmer dome will tend to maintain the temperature of the tank elevated, whereas otherwise the discharging gas entering at 9, at decreasing temperatures, would tend to lower the tank's temperature, and so cumulatively to decrease prevailing temperatures.

Figure 2 illustrates a slightly different way of effecting further heat-exchange interrelationship between the liquid and the gas. Here, the duct 4 continues downwardly, as indicated at 4a, to the bottom of the standpipe 11 and then extends upwardly, in heat exchange relation to the standpipe, either exteriorly about or interiorly within the latter, until it discharges into the central chamber 8 of the venturi fitting 6. In Figure 2, the upward extent 4b of the duct 4 has been shown as located coaxially within the standpipe 11. In consequence, the temperature of the entire body of liquid within the liquid space P, and in particular the liquid rising within the standpipe, serves to maintain the temperature of the gas discharging from the duct 4, or at least minimizes the drop in temperature thereof, and in addition the temperature drop is minimized in exactly the same ways as has already been pointed out in connection with Figure 1.

It might be possible to bubble the gas through the liquid, but this effects a foaming of the liquid, and would be less desirable, although by bubbling the gas through a standpipe the foaming would all be confined, and the objections would be lessened. Also, heat exchangers might be used, but they would be of less efficiency and would increase the weight. Nevertheless, the present invention is to be considered in its broad aspect as the placing of the expulsive gas in active and intimate heat-exchange relationship with the liquid to be expelled for the purpose of minimizing the drop in temperature of the gas by heat transfer from the rather considerable mass of liquid, and thereby attaining the ultimate end, which is the employment of the minimum volume and weight of gas and gas tank for the purpose of expelling a given volume of liquid propellant.

We claim as our invention:

1. A fuel supply system for a liquid rocket propellant, comprising a closed tank to contain a liquid fuel to a level below its top, to leave an open space above such level, and having an outlet from the liquid space therein, a duct leading into said tank and constituting a source of gas under pressure, and aspirator means within the open space within said tank, arranged to discharge directly into such open space, and connected respectively to said duct for gas supply and to the liquid space for liquid supply, to discharge liquid droplets entrained with the discharged gas into the tank's open space, during expulsion of the liquid through said outlet.

2. A fuel supply system for a rocket propellant liquid, comprising a closed tank to contain a liquid fuel to a level below its top, to leave a space above such level, and having a bottom outlet, a duct leading into said tank and constituting a source of expellant gas under pressure, aspirator means defining a venturi throat located in such space above the liquid level in said tank, a standpipe leading from the lower liquid-containing part of said tank and terminating in an orifice at the low-pressure region of the venturi throat, said duct being connected for discharge of gas through the venturi throat of said aspirator means, whereby to entrain discharge of liquid droplets into the tank space from the standpipe through said orifice.

3. A fuel supply system as in claim 2, wherein the tank is domed above the tank's space, and the aspirator means is located in such domed space, with the discharge end of its venturi throat arranged for radial discharge upon the interior of the dome.

4. A fuel supply system as in claim 2, wherein the gas duct leads into the aspirator means from above the tank, and the liquid standpipe leads into the aspirator means from below.

5. A fuel supply system as in claim 2, wherein the gas duct leads upwardly coaxially of and in heat exchange relation with liquid within the standpipe, and is connected at its upper end for discharge into the aspirator means, inwardly of the venturi throat.

6. A fuel supply system as in claim 2, wherein the aspirator means is formed with a central chamber and a substantially circular, radially directed venturi throat leading from said central chamber, the standpipe terminating in a plurality of orifices angularly spaced about the circular throat, and the gas conduit means communicating with said central chamber.

7. A process of minimizing temperature drop in an expellant gas used to effect expulsion from a tank of a body of liquid rocket propellant, occurring during expansion of such gas accompanying expulsion, which process comprises aspirating a quantity of such liquid by such gas, to propel droplets of the liquid into the space above the body of liquid and to absorb the temperature drop in the expanding gas by the droplets as a result of the intimate intermixture of the two during aspiration, subsequently applying the pressure of the aspirating gas to the surface of the liquid body, to expel the liquid from the tank, and draining the droplets back into the body of liquid, to absorb within the latter the temperature drop caused in the droplets by expansion of the gas during aspiration.

8. A supply system for a rocket propellant liquid, comprising a closed tank to contain such liquid to a level below its top, leaving a space above such level, and having a bottom outlet, aspirator means within such space including a venturi throat and a connection to a source of expellant gas under high pressure, arranged for discharge through the venturi throat into such space, a standpipe within said tank open to the liquid at its bottom, and ports affording communication between the upper end of said standpipe and a low pressure region of the venturi throat, for discharge of aspirated liquid in the form of a mist into the space above the liquid level in said tank.

9. A process of minimizing the temperature drop in an expellant gas used to effect expulsion from a tank of a body of liquid propellant to a rocket motor, occurring during expansion of such gas accompanying expulsion, which comprises employing the gas initially as an aspirating agent to entrain liquid propellant, for discharge in the form of droplets into a confined space within the tank above the body of liquid propellant, thereby effecting heat transfer from the droplets to the gas, and draining the cooled droplets back to the liquid body, for equalization of temperature as between the droplets and the liquid body, and meanwhile applying the pressure of the aspirating gas to the surface of the liquid body to expel the liquid from the tank.

(References on following page)

References Cited in the file of this patent

UNITED STATES PATENTS

| | | |
|---|---|---|
| 243,769 | Fox | July 5, 1881 |
| 542,400 | Wood | July 9, 1895 |
| 793,253 | Weiberg | June 27, 1905 |
| 1,238,633 | Caldwell | Aug. 28, 1917 |
| 1,922,920 | Aherne | Aug. 15, 1933 |
| 2,248,073 | Gage | July 8, 1941 |
| 2,697,483 | Stanley | Dec. 21, 1954 |
| 2,713,895 | Eckstrom | July 26, 1955 |
| 2,724,433 | Whitterell | Nov. 22, 1955 |